No. 829,611. PATENTED AUG. 28, 1906.
E. H. TURNER.
AUTOMATIC POULTRY FEEDER, WATER FOUNTAIN, AND YOUNG POULTRY PROTECTOR.
APPLICATION FILED DEC. 29, 1904.
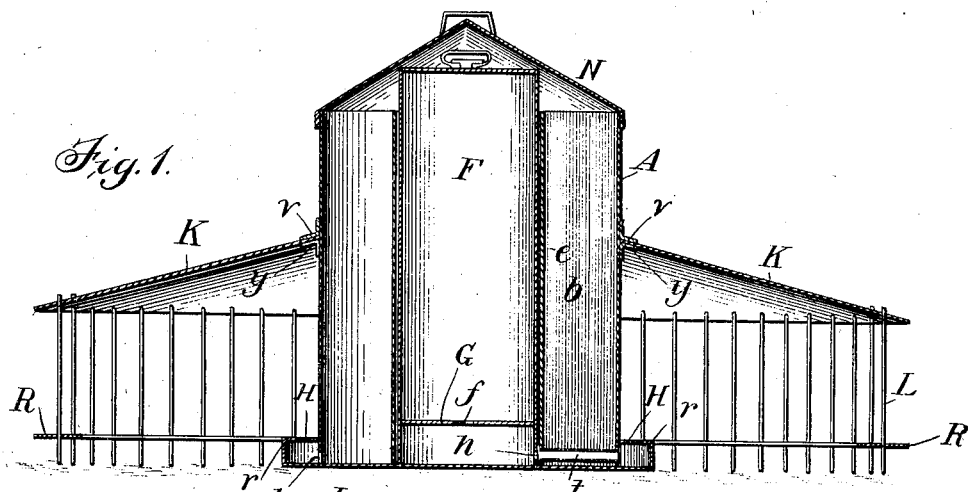
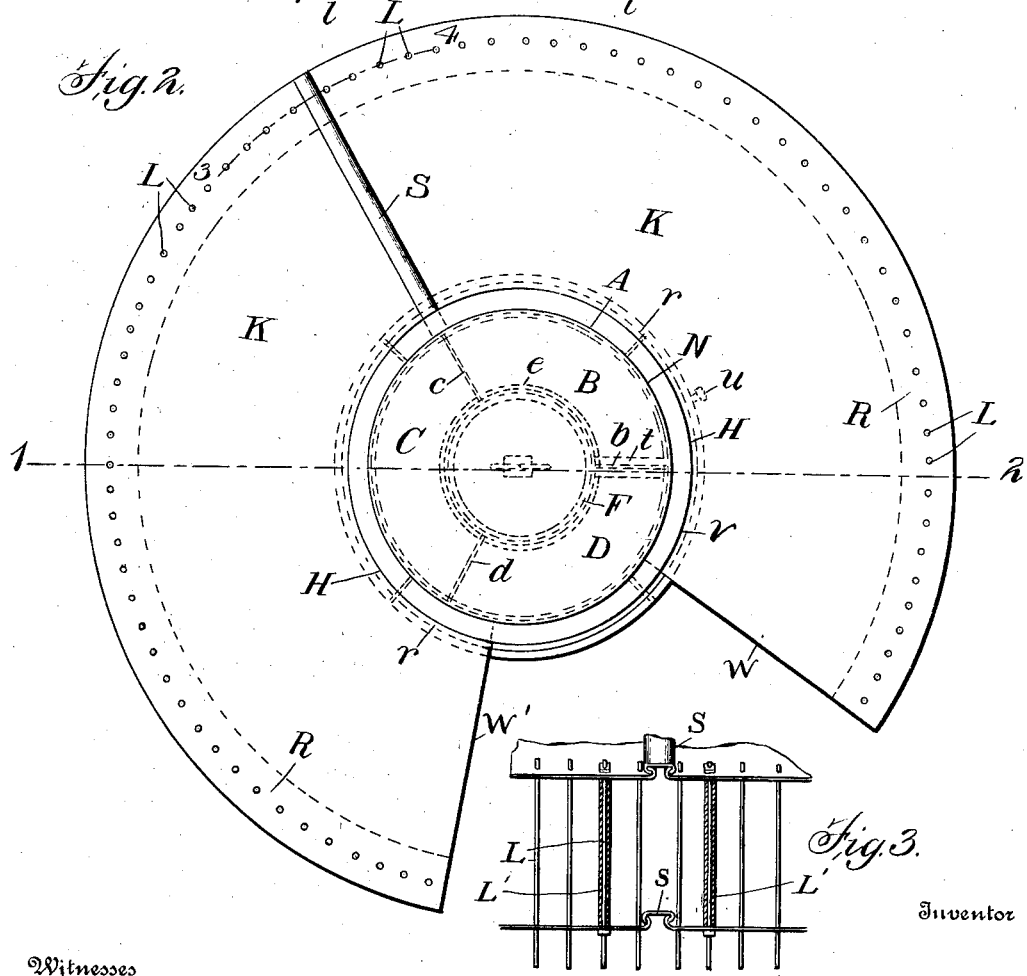

UNITED STATES PATENT OFFICE.

ELIJAH HERBET TURNER, OF TIPTON, IOWA.

AUTOMATIC POULTRY-FEEDER, WATER-FOUNTAIN, AND YOUNG-POULTRY PROTECTOR.

No. 829,611. Specification of Letters Patent. Patented Aug. 28, 1906.

Application filed December 29, 1904. Serial No. 238,784.

*To all whom it may concern:*

Be it known that I, ELIJAH HERBET TURNER, a citizen of the United States, residing at Tipton, in the county of Cedar and State of Iowa, have invented a new and useful Automatic Poultry-Feeder, Water-Fountain, and Young-Poultry Protector, of which the following is a specification.

My invention relates to improvements in poultry fountains and feeders, and includes a protector for young poultry while they are feeding and drinking, which protector excludes the larger fowls from portions of the trough. It protects the young poultry and also the feed from the rain, so that both the feed in the storage-cans and that in the troughs is kept dry.

The device is so arranged that different kinds of feed (three in the present case) and fresh water feed automatically into separate divisions of the trough, which surrounds the base of the can in which the supply-reservoirs are found.

The protector is so arranged that the divisions of the trough used for feed and the two ends of the water-trough will be exposed to the young fowls alone, while the larger fowls may drink from the middle portion of the trough containing the water, or, if desired, it may be turned about the can and trough, so that a part of any two adjacent divisions of the trough will be exposed to the larger fowls and the remainder of the trough will be under the protector. If it is desired, when the younger fowls no longer need protection as thus afforded them the protector may be removed, leaving a combined waterer and feeder, supplying different kinds of feed and also water to all of the fowls.

The device is made of metal throughout and is adapted to outdoor usage.

The objects of my invention are, first, to provide a simple and compact device which will feed automatically several kinds of feed and also water into small troughs, keeping a small amount exposed in the trough, so that it is accessible to the fowls at all times, while the supplies will be kept fresh and clean; second, to provide protection for young fowls while at their feed and water by excluding the larger fowls from such parts of the trough as may be desired and at the same time allowing the larger fowls to have access to the water or feed, or both, all from the same device; third, to provide a poultry feeder and fountain which will also afford protection from the rain for the smaller fowls and also for the feed, so that the device may be used to advantage in the open air; fourth, to provide a poultry-fountain in which the supply-can is placed within another can and is surrounded by an air-chamber and in which the supply-cans of the feeders are so placed that they will also aid in keeping the supply of water cool. I attain these results by the device illustrated in the accompanying drawings, in which—

Figure 1 is a vertical section of the entire device on the line 1 2, Fig. 2. Fig. 2 is a plan of the entire device. Fig. 3 is a vertical section on the curved line 3 4, Fig. 2, showing the pickets and the manner of fastening the two parts of the protector together.

Within the storage-can A and the same height as the outside wall of A is made an inner circular wall $e$. This wall is secured to the bottom of the can A so that it will be water-tight. This forms the inner wall, and A is the outer wall of the apartments B, C, and D, which apartments are for feed. The water-can F is made so that it will fit inside of $e$, leaving a small air-space between F and $e$.

The feed-apartments (three in the present case) B, C, and D are separated by the walls $b$, $c$, and $d$, and the feed is placed directly in these apartments. The apartment within the wall $e$ is for water, and the supply-can F is placed therein.

The narrow trough H extends about the base of the can A and is divided into apartments, there being one apartment for water and one for each feed-supply apartment within the can A. From the feed-apartments B, C, and D of the can A there are small openings $l$, leading into the apartments of the trough immediately outside of the feed-apartments. The other division of the trough is for water, and it is connected with the inner chamber in which F is placed by a small tube $t$, so that the water in the trough will maintain the same level as that within the wall $e$. The trough is made deep enough so that before it is quite filled the feed in it will close the openings into the supply-apartments, and the flow will cease till some of the feed has been removed from the trough. The top of the trough is partly covered by the strip $r$, as shown in the drawings, Fig. 1. This keeps the fowls from scratching the feed out of the trough and wasting it. An outlet with a small screw-cap u is placed in the water-trough, so that the dirty water may be easily removed and the fountain cleansed without disturbing the rest of the device.

The distance between the outer wall of A and the inner wall e not being very great, practically all of the feed in the apartments will flow into the trough, where it will be accessible to the fowls, before the trough will become empty.

The water-supply can F being surrounded by an air-chamber between said can and the wall e and also by the feed-apartments B, C, and D, the water is thus kept cool in summer and is protected from the cold in fall and winter.

The supply-can F is inverted within the wall e and is constructed as shown in Fig. 1. It is a can having practically the same diameter throughout its entire length. Near the open end the disk G is secured, which nearly closes the can where it is placed. The can F also has a small opening h, which opening is nearer the open end of the can than the disk G. This opening regulates the height of the water in the trough. When enough water has come out of the can F to fill the trough and the apartment within, e, so that it comes above h, no more air can enter the can F, and the flow will cease till enough water has been taken out of the trough to lower the water below the hole h and allow more air to enter F. The only purpose of the disk G with its small hole f is to keep too much water from flowing out when the can is inverted and placed in position after having been filled. This being the case, it is not necessary that it should be fitted perfectly tight, but may be soldered at a few points only, thus reducing the cost, or it may be secured by simply having a small groove in the wall of F, where it is desired to fit G, then have G fit snugly into this groove, with, perhaps, a few drops of solder to hold it a little more securely. This form of can may be made at a small cost and is easily filled and will regulate the flow of water perfectly.

The protector covers about three-fourths of the trough and fits closely about the can A. Being more than a semicircle, it is held in position about A by its own shape. A small flange V may be soldered to the can A just above where the protector fits about it. This will divert the water which might otherwise flow down the sides of the can in case of rain, dampening the feed in the troughs. The top piece of the protector (shown as K) extends in nearly a horizontal plane, the outer edge being slightly lower than the inner. The inner edge fits about the can A, and when in position the outer edge forms about three quadrants of a circle.

Several small supports or projections Y, (five being sufficient,) as shown in Fig. 1, are fastened to the outer wall of the can A slightly below the flange V. These are placed at intervals, so that they support the inner edge of the protector. At the outer circular edge of the protector pickets reach from this top piece to the ground, and at that part of the edge which is not guarded by pickets and which is not against the can A, which edge is shown by W and W' in Fig. 2, there is a piece of metal reaching from the top piece to the ground. The holes for the pickets are made about an inch apart, and the bottom part of the protector R is a narrow strip of metal corresponding in shape to the circular edge of the top piece and is placed immediately below said edge. It also has holes in it to receive the pickets. About every six inches a picket, as L', is fastened, secured to both top and bottom parts of the protector. These pickets aid in giving rigidity to the protector, and the remainder of the pickets may be removed as desired to vary the size of the entrances to the feed-troughs beneath the protector. The pickets which are fastened permanently may be held in place as follows: A washer is fastened on the picket at the proper height to fit immediately beneath R. A small tube is then inserted between R and K, which fits about the picket when inserted in the holes. This tube is the proper length to hold R and K the proper distance apart. The picket is then inserted through R, the tube, and K, and a nut is then placed on the other end above K. This method of fastening is a convenient one and enables one to set up the device after it has been taken apart for shipment without solder or other tedious work. This method is shown in Fig. 3. The protector may be turned about the can A, so that any division desired or parts of any two adjacent divisions may be left exposed to the larger fowls. It may be made in two parts, neither of which should be greater than a semicircle, in order that it may be taken apart and removed when desired, as is sometimes the case when the small fowls no longer need the protection thus afforded them.

The joint may be made as follows: The edges of the two parts to be joined together are both turned back. A narrow strip of metal S, corresponding in length to the width of the pieces to be joined together, has both edges turned back, so that when the parts to be joined are placed in position the edges of the strip may be inserted beneath the edges of the protector which had been turned back, as shown in Fig. 3. The strip is then slipped into position as shown in Fig. 2.

The top or lid for the can A is cone-shaped, with a handle at the apex of the cone. This top, which is placed on the can as shown in Fig. 1, is provided with a flange fitting snugly outside of the can A, thus holding the lid in position and forming in all a lid which will turn all water off and allow none to enter the can A so long as it is in position.

I am aware that prior to my invention poultry waterers and feeders have been in use which involve the same principles as those which I use in my invention; but What I do claim as my invention, and desire to secure by Letters Patent, is—

1. In combination, an outer receptacle, an inner receptacle, partitions connecting the outer and inner receptacles and dividing the space formed therebetween into compartments, a vessel fitting within the inner receptacle, a trough surrounding the outer receptacle, said trough being divided into compartments, one of said compartments being in communication with the vessel, and the remainder of the compartments in communication with the compartments formed by the partitions.

2. In combination, an outer receptacle, an inner receptacle, a trough surrounding the outer receptacle, partitions connecting the outer and inner receptacles dividing the space formed therebetween into compartments, a vessel fitting within the inner receptacle, and having an air-space therearound, said trough being divided into compartments, certain of said compartments being in communication with the compartments formed by the partitions, the remainder of the compartments in communication with the vessel.

3. In combination, an outer receptacle, an inner receptacle, a trough surrounding the outer receptacle, partitions connecting the inner and outer receptacles dividing the space formed therebetween into compartments, a vessel fitting within the inner receptacle, said vessel being provided with a perforated bottom, said trough being divided into compartments, certain of said compartments being in communication with the compartments formed by the partitions, the remainder of the compartments being in communication with the vessel.

4. In combination, an outer receptacle, an inner receptacle, partitions connecting the outer and inner receptacles dividing the space formed therebetween into compartments, a vessel fitting within the inner receptacle, a trough surrounding the outer receptacle, said trough being divided into compartments, certain of said compartments being in communication with the compartments formed by the partitions, the remainder of the compartments being in communication with the vessel.

5. In combination, an outer receptacle, an inner receptacle, partitions connecting the outer and inner receptacles dividing the space formed therebetween into compartments, a vessel fitting within the inner receptacle, a trough surrounding the outer recepticle, said trough being divided into compartments, certain of said compartments being in communication with the compartments formed by the partitions, a pipe passing through one of the compartments formed by the receptacles, said pipe being in communication with the remainder of the compartments of the trough and with the vessel.

6. In combination, a receptacle, a trough surrounding the receptacle in communication with the interior of the receptacle, and a canopy partly surrounding the receptacle.

7. In combination, a receptacle, a trough surrounding the receptacle in communication with the interior thereof, a canopy arranged on the exterior of the receptacle, said canopy being formed in sections, the opposing edges of the sections being flanged, and means for engaging the flanges to secure the sections one to the other.

8. In combination, a receptacle, a trough surrounding the receptacle in communication with the interior thereof, a canopy arranged on the exterior of the receptacle, said canopy being formed in sections, the opposing edges of the sections being flanged, and a flanged strip adapted to engage the flanges of the sections to secure the sections one to the other.

9. In combination, a receptacle, a trough surrounding the receptacle in communication with the interior of the receptacle, a canopy arranged around the exterior of the receptacle, said canopy being formed in sections and means for securing one section to the other.

In testimony whereof I have signed my name to this specification in the presence of two subscribing witnesses.

ELIJAH HERBET TURNER.

Witnesses:
CARL H. MATHER,
HARRY TRIECHLER.